United States Patent [19]

Brimhall, Jr. et al.

[11] Patent Number: 4,521,308

[45] Date of Patent: Jun. 4, 1985

[54] ROTARY SUPPORT FOR VACUUM FILTRATION APPARATUS

[75] Inventors: George H. Brimhall, Jr., Berkeley; Leonard J. Vigus, Walnut Creek, both of Calif.

[73] Assignee: The Regents of the University of California, Berkeley, Calif.

[21] Appl. No.: 407,708

[22] Filed: Aug. 13, 1982

[51] Int. Cl.³ .............................................. B01D 33/00
[52] U.S. Cl. .................................... 210/330; 210/406; 422/101
[58] Field of Search ................ 210/330, 406; 222/144, 222/476, 485; 141/234, 235, 279, 237, 281, 83, 2, 8, 268, 369, 375, 65, 66; 137/263; 422/99, 101, 261

[56] References Cited

U.S. PATENT DOCUMENTS

| | | | |
|---|---|---|---|
| 1,097,708 | 5/1914 | Elson | 422/101 |
| 1,316,789 | 9/1919 | Grimwood | 210/406 |
| 1,397,520 | 11/1921 | Howe | 141/268 |
| 2,441,204 | 5/1948 | Nusbaum | 210/435 |
| 3,437,211 | 4/1969 | Lindsey | 210/406 |
| 3,478,889 | 11/1969 | Fessler | 210/406 |
| 3,501,012 | 3/1970 | Ryan | 210/406 |
| 3,956,125 | 5/1976 | Strutt et al. | 210/406 |
| 4,058,120 | 11/1977 | Caparelli et al. | 222/144 |
| 4,301,010 | 11/1981 | Eddleman et al. | 210/406 |
| 4,375,409 | 3/1983 | Gentry | 210/244 |

Primary Examiner—Charles N. Hart
Assistant Examiner—Wanda L. Millard
Attorney, Agent, or Firm—Phillips, Moore, Lempio & Finley

[57] ABSTRACT

Concurrent operation of a sizable number of vacuum filtration units is facilitated by a rotatable carrier stand. Any selected one of the units may readily be turned to a position convenient to the operator without interruption of the vacuum connections and without entanglement of vacuum lines. Components of the filtration units may then be manipulated with a reduced risk of breakage, spillage or inadvertent disconnection of vacuum lines. Installation and removal of a filtration unit may be accomplished very quickly and simply with the use of only one hand in some cases. Simultaneous filtering operations may be performed more efficiently particularly within enclosures such as fume hoods, glove boxes or the like which otherwise restrict access to the filtration units by an operator.

13 Claims, 6 Drawing Figures

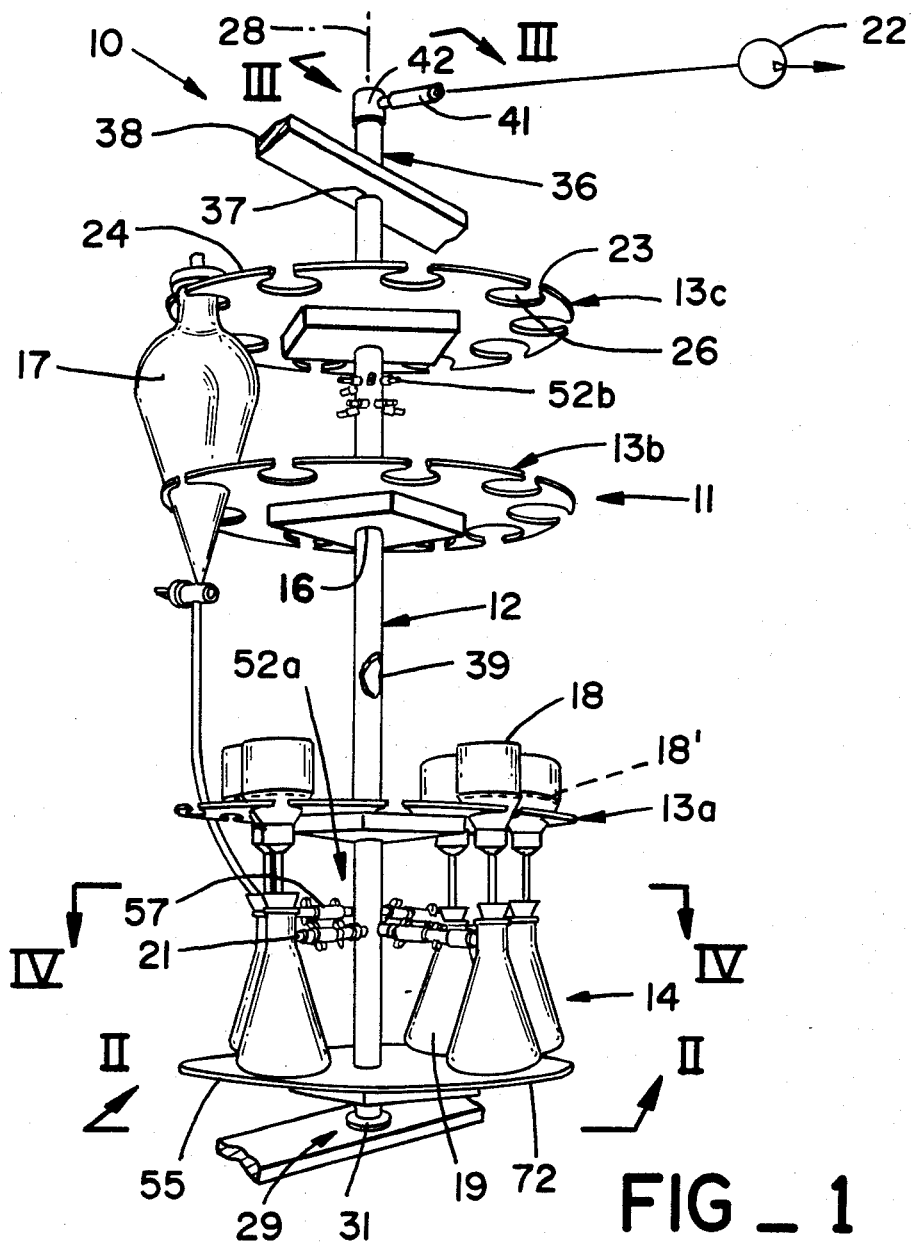
FIG_1
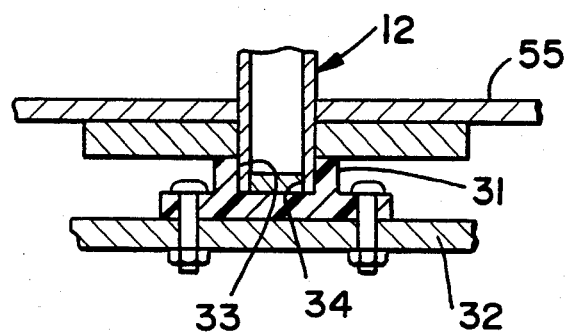
FIG_2

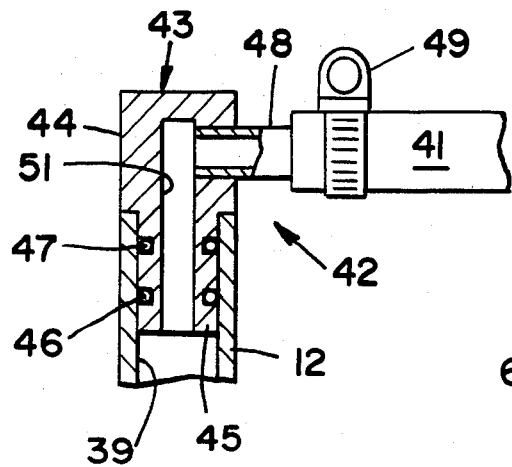
FIG_3
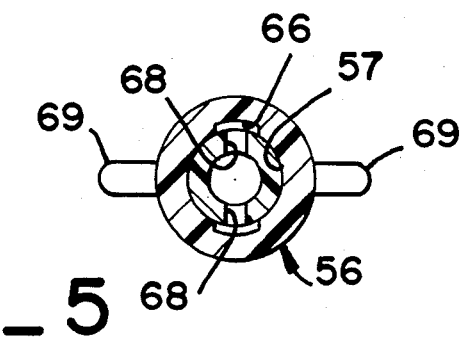
FIG_5
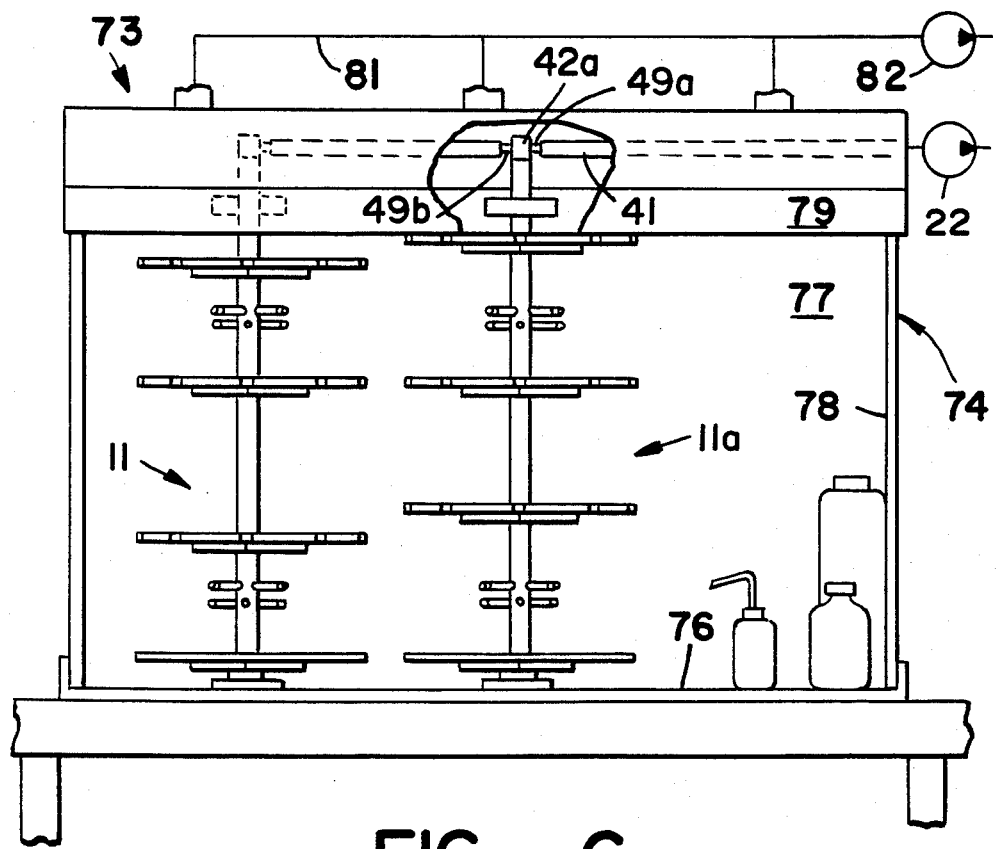
FIG_6

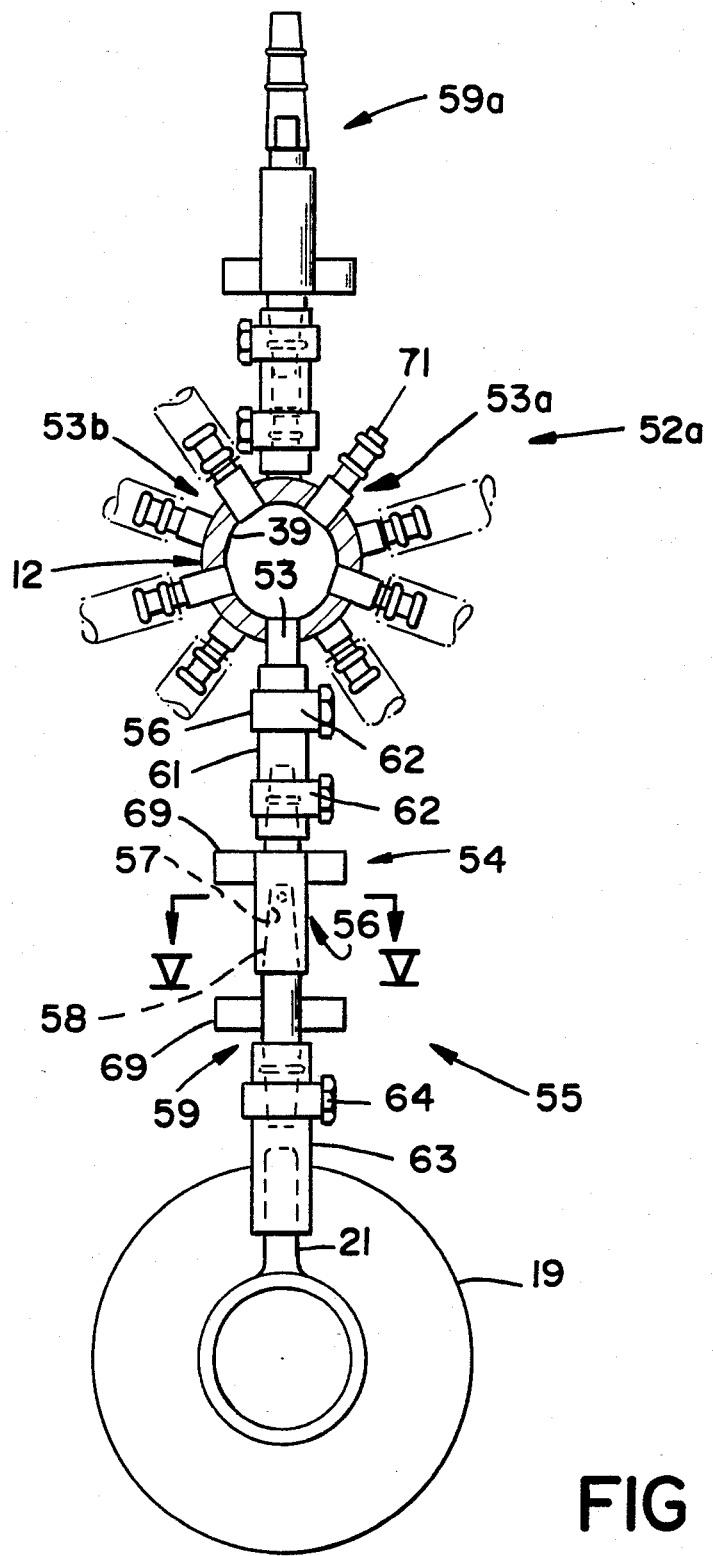
FIG_4

ROTARY SUPPORT FOR VACUUM FILTRATION APPARATUS

The Government has rights in this invention pursuant to Grant No. EAR7911342 awarded by the National Science Foundation.

TECHNICAL FIELD

This invention relates to the filtering of suspensions of solids from fluids. More particularly the invention relates to apparatus for supporting a plurality of individual filtration units of the type in which flow through the filters is induced by establishing a low pressure in the filtrate receivers.

BACKGROUND OF THE INVENTION

In many filtering operations it is necessary or at least advantageous to induce flow through the filter by connecting the filtrate receiver to a suction pump or the like. If a number of such vacuum filtration operations are to be performed simultaneously, it is usually more practical to connect a plurality of the individual filtration units to a single suction pump through a vacuum manifold and a number of individual vacuum lines.

Prior equipment for performing simultaneous vacuum filtration operations on a sizable number of samples typically includes individual filtration units which are arranged in a series of parallel rows on a fixed carrier or support structure. This makes it necessary to reach through, over or around the more forward units in order to manipulate the filters, flasks, fittings and the like of the more rearward ones. This can be very taxing to the personnel who operate the apparatus and can result in breakage of components, inadvertent disconnection of fittings or the like or other disruptions that may include spillage of substances involved in the process. Spacing of the units to reduce the risk of such occurrences also reduces the number of filtering operations which can be performed in the available space.

The above described problems are particularly acute when the filtering operations must be performed within an enclosure or under other conditions where the operator may not be able to move around the collection of filtering units to facilitate access to particular specific ones. These conditions occur, for example, where the filtering operations are performed within a fume hood, glove box or the like to prevent release of substances used in the operations or to protect such substances from contamination. This may be necessary, for example, where toxic or radioactive substances are present or where certain biological substances, such as viral or bacterial cultures or genetic materials, are being processed. Under these circumstances operations such as manipulation of the flasks, filters and other components and the connection and disconnection of vacuum lines are difficult and may also be hazardous in some cases if some of the filtration units must be situated behind others in order to fit into the available space.

The present invention is directed to overcoming one or more of the problems as set forth above.

SUMMARY OF THE INVENTION

In one aspect of the present invention vacuum filtration apparatus has a stand for supporting a plurality of filtration units which include filtrate receiver flasks and has a source of low pressure and means for communicating the filtrate receiver flasks with the low pressure source. The apparatus is further provided with means for enabling rotational movement of the stand including the filtration units about a predetermined axis and means for maintaining the filtrate receiver flasks in communication with the low pressure source during the rotational movement of the stand.

The invention provides for supporting a number of individual vacuum filtration units in one or more circular arrays which can be jointly rotated to bring any selected one of the units to a position where it is readily accessible to the operator without interrupting vacuum connections to each individual unit and without entanglement of vacuum lines. The apparatus may be situated within a partial or complete enclosure such as a fume hood or a glove box or the like to enable simultaneous performance of a large number of filtration operations within the restricted available space. Manipulation of the components of the filtration units is facilitated and the risk of breakage, spillage and inadvertent disconnection of vacuum lines or the like is greatly reduced. In the preferred form of the invention each individual unit may be emplaced on the stand with one hand and suction may be selectively applied to each unit, without affecting the others, while the unit is in place on the stand.

The invention, including additional objects and advantages thereof, may be further understood by reference to the following description of preferred embodiments.

BRIEF DESCRIPTION OF THE DRAWINGS

FIG. 1 is a perspective view of vacuum filtration apparatus in accordance with one embodiment of the invention;

FIG. 2 is an elevation section view of a portion of the apparatus of FIG. 1 taken along line II—II thereof;

FIG. 3 is an elevation section view of another portion of the apparatus of FIG. 1 taken along line III—III thereof;

FIG. 4 is a plan section view of still another portion of the apparatus of FIG. 1 taken along line IV—IV thereof;

FIG. 5 is a cross section view taken along line V—V of FIG. 4, and

FIG. 6 is a front elevation view of an embodiment of the invention with which vacuum filtration operations are performed within a fume hood.

DETAILED DESCRIPTION OF PREFERRED EMBODIMENTS OF THE INVENTION

Referring initially to FIG. 1 of the drawings, vacuum filtration apparatus 10 in accordance with this embodiment of the invention includes a stand 11 having a vertical tubular central shaft 12 and circular shelves 13a, 13b and 13c that function as carriers for vacuum filtration units 14.

Shelves 13a, 13b and 13c are coaxially positioned on the shaft 12, which extends through an opening 16 at the center of each shelf, the shelves being retained at a desired position along the shaft by a tight friction fit between the shaft and openings 16. Thus the vertical level of any of the shelves 13a, 13b, 13c may be changed by sliding the shelf up or down along the shaft with sufficient force and the shelves may also be turned relative to each other to facilitate set up of filtration units 14. The shelves 13a, 13b, 13c may be fixedly secured to the shaft 12 in some instances where only filtration units 14 of a single size and type are to be utilized.

The filtration units 14 may be of any of a variety of known forms and in this example include Buechner funnels 18 which contain the filter material 18' and suction flasks 19 which are the filtrate receivers and which have a fitting 21 for connection to a low pressure source such as a suction pump 22. In some cases, the filtration units 14 may also include separatory funnels 17 for holding sizable quantities of the liquid to be passed through the filters.

To receive and support components of the vacuum filtration units 14, each of the shelves 13a, 13b and 13c has a series of notches 23 which extend inward from the rim 24 of the shelf to an associated one of a series of circular openings 26 spaced at equal angular intervals around the outer portion of the shelf, there being ten such notches and openings on each shelf in this particular example. In a typical usage of the filtration apparatus 10, Buechner funnels 18 rest on one of the shelves 13a with the relatively small lower portion of the funnel extending downward through one of the openings 26 into one of the suction flasks 19. The tapered lowered portion of the separatory funnel 17, if one is required, extends downward through the corresponding opening 26 of the next uppermost one of the shelves 13b. Suction flasks 19 are supported below the Buechner funnels 14 by attachment to shaft 12 as will hereinafter be described in more detail.

The shaft 12 and shelves 13a, 13b and 13c are jointly rotatable about the vertical axis 28 of the shaft so that any selected one of the filtration units 14 may be turned to an easily accessible position. Rotary support means 29 for this purpose includes a bottom bearing 31 secured to a fixed support platform 32 which may, for example, be the floor of a fume hood or the like in which the vacuum filtration apparatus 10 is situated as will hereinafter be described in more detail. Referring to FIG. 2, the bottom bearing 31 of this example has a circular well 33 into which the closed lower end of the tubular shaft 12 is received the shaft being retained in the bearing by the weight of the stand 11. The bearing 31 is preferably formed of a durable low friction material such as Teflon plastic for example. Referring again to FIG. 1, the upper portion 36 of the shaft 12 extends through a conforming opening 37 in a fixed transverse brace 38 which is secured to suitable support structure such as, for example, the top of a fume hood as will hereinafter be described.

The inlet of the suction pump 22 or other low pressure source is communicated with the interior passage 39 of the shaft 12 through an intake conduit 41 and a rotary seal 42 situated at the top of the shaft. Referring now to FIG. 3, the rotary seal 42 in this example includes a cylindrical element 43 having an upper portion 44 abutting the top of shaft 12 and a tubular lower portion 45 of smaller diameter which extends into the upper end of shaft 12 in coaxial relationship with the shaft. The lower portion 45 has exterior annular grooves 46 in which circular resilient O-rings 47 are disposed to form a fluid tight seal between the element 43 and shaft 12.

A tubular fitting 48 extends sidewardly from the upper portion 44 of element 43 into the suction pump intake conduit 41 the conduit being secured to the fitting with a hose clamp 49. Fitting 48 communicates with an axial passage 51 in element 43 that opens into the passage 39 of shaft 12. Thus the rotary seal assembly 42 provides for establishing a partial vacuum within the shaft 12 while enabling rotational motion of the shaft 12 and elements carried thereon. In the present example, the suction pump conduit 41 is sufficiently rigid to prevent any significant rotational movement of element 43 but in instances where this is not the case, the element 43 may be directly secured to adjacent fixed structure.

Referring now to FIG. 1 and FIG. 4 in conjunction, suction is applied to flasks 19 through vacuum manifolds 52a and 52b which extend from shaft 12. Manifold 52a is situated below the lowermost shelf 13a and manifold 52b is between the intermediate and uppermost shelves 13b and 13c respectively. Each such manifold, such as 52a for example, includes a series of tubular vacuum fittings or nipples 53 which extend radially from shaft 12 and which are equal in number to the number of retainer openings 26 on the shelf 13a which is situated above the manifold, there being ten such nipples in each manifold 52a and 52b in this particular example.

To provide sufficient space for hose connections at each nipple 53, the nipples in this embodiment are divided into two groups of five. The first group of nipples 53a is situated slightly higher on shaft 12 than the second group of nipples 53b. The nipples 53a and 53b of each such group are spaced at equal angular intervals around the shaft with the nipples 53a of one group being at angular positions on the shaft which are intermediate between those of the nipples 53b of the other group.

Individual ones of the suction flasks 19 are supported on individual nipples 53 and are also communicated with the low pressure passage 39 within shaft 12 through vacuum conduits 55 which preferably include tube connector assemblies 54. In the preferred form, the connector assemblies 54 have a construction which allows the operator to install or remove a flask 19 with one hand and which also provide a valve function so that suction can be selectively applied to each flask 19 or be shut-off from each flask while it is mounted on the stand 11.

Tube connectors 54 suitable for this purpose may be of a commercially available form having a first element 56 with a tapered passage 57 into which a tapered end portion 58 of a second element 59 may be inserted and frictionally engaged. The first element 56 is secured to an associated one of the nipples 53 by a short stiff section of hose 61 and hose clamps 62. The second element 59 extends into one end of another short stiff hose 63 and is secured by another clamp 64. Fitting 21 of the associated flask 19 extends into the other end of hose 63 and is retained by a tight friction fit.

Hose 61 and first connector element 56 may be left permanently attached on the associated nipple 53 while hose 63 and second connector element 59 remain on the flask 19. Thus a flask 19 may be emplaced on the stand 11 by inserting end portion 58 of the second element 59 into passage 57 of the first element 56 after which the flask is supported by shaft 12 through the connector assembly 54 and stiff hoses 61 and 63. A flask 19 may be removed by simply withdrawing second connector element 59 from the first connector element 56.

Referring now to FIGS. 4 and 5 in conjunction, longitudinal slots 66 extend along opposite portions of passage 57 of first connector element 56. The passage 67 within the tapered portion 58 of the second connector element 59 is closed at the end but has a pair of radially directed outlets 68 at opposite sides. Thus suction can be applied to the associated flask 19 by turning the second connector element 59 relative to the first element 56 to bring outlets 68 into communication with slots 66. Suction may be blocked from the flask 19 by turning the second connector element 59 to move outlets 68 away from slots 66. To facilitate turning of first element 56 relative to second element 59, tabs 69 extend sidewardly from each such element.

Additional ones 59a of the second connector elements 59 may be used to seal connector assemblies 54 which are not coupled to a flask 19 at a particular time. For this purpose the additional second element 59a is engaged in the first element 56 as previously described except that it is turned 90° to the hereinbefore described closed position. Alternately, corks 71 may be used to seal connectors 54 which are not in use and such corks may also be used to close ones of the nipples 53 that are not provided with a hose 61 and connector assembly 54 at a particular time.

Referring again to FIG. 1, a circular tray 72 is disposed on shaft 12 immediately above the bottom bearing 31 to assure retention of the suction flasks 19 and to provide a place for temporarily supporting the flasks during assembly of the filtration units 14.

The filtration apparatus 10 as described to this point greatly facilitates filtration operations as it enables access to any particular unit without requiring that the operator reach through, around or over some units in order to manipulate others. Although the invention broadly is not limited to such usage, this capability is particularly significant in instances where filtration operations must be performed within a partial or complete enclosure because of the presence of toxic materials, radioactive substances or biological material requiring isolation or for other reasons.

For example, with reference to FIG. 6, the rotary stand 11 and associated structures as previously described may be situated within a fume hood 73 of the general type used for operations which may generate gases that should not be released into the adjacent atmosphere because of toxicity or for other reasons. The fume hood 73 of this embodiment is of the type having a housing 74 defined by a floor 76, back wall 77, sidewalls 78 and peaked roof 79 with outlet manifolding 81 which communicates with the inlet of an exhaust pump 82. The airflow into the open front of the fume hood 73 caused by pump 82 draws gases which may be generated by the filtration operations upward and into the pump for venting to the atmosphere at a remote point or for scrubbing or other pollution control treatment depending on the nature of the gases. The rotary stand 11 may also be disposed in fume hoods of the kind which are fully closed during operation or in other enclosures such as glove boxes for example.

As illustrated in FIG. 6, one or more additional rotary stands 11a may be included in a single fume hood 73 or the like to provide greater filtration capacity. The additional stand 11a may be structurally similar to the previously described stand 11 although it is advantageous in many instances to provide a modified rotary seal 42a which has two oppositely directed outlet fittings 49a and 49b so that both stands 11, 11a may be connected in series relationship to the intake conduit 41 of the suction pump 22 or the like.

OPERATION

In use, an individual filtration unit 14 is set up by turning the stand 11 including shelves 13a, 13b, 13c and shaft 12 to bring a vacant group of the shelf openings 26 to an easily accessible position such as a position directly in front of the operator. The suction flask 19 is attached to the corresponding vacuum nipple 53 of shaft 12 by tightly inserting the tapered end portion 58 of the connector element 59 that is engaged on the flask into passage 57 of the connector element 56 which is engaged on the nipple. As previously pointed out, this operation may be performed with one hand if desired.

If a separatory funnel 17 is to be used, the tapered lower portion is inserted downwardly through the corresponding opening 26 of the next uppermost shelf 13b and entered into the Buechner funnel 18. The vacuum filtration operation may then be performed in the known manner.

Stand 11 may then be turned to bring other openings 26 to positions convenient to the operator and one or more additional vacuum filtration units 14 may be set up in a similar manner. The stand 11 may also be rotated to facilitate disassembly, inspection or adjustment of individual ones of the filtration units 14 without disrupting operation of others of the units. Vacuum may be applied to any particular one of the filtration units 14 or may be disconnected from the unit, without affecting other units, by turning the second connector element 59 relative to the first element 56 in the manner previously described.

Because of the friction fitting of the shelves 13a, 13b and 13c onto shaft 12, any individual one of the shelves may be slid upward or downward on the shaft to accommodate to filtration unit components of different sizes or shapes and the shelves may also be turned relative to each other if necessary to facilitate interconnection of such components during setup.

Turning of the stand 11 to bring any selected one of the filtration units 14 or any desired vacant position on the shelves 13a, 13b, 13c to a position convenient to the operator avoids difficulties in setting up the filtrations and in monitoring operations and in disassembly of the units. The operator need not move around behind the collection of filtration units 14 or reach through or around some units in order to manipulate others. This also reduces the risk of inadvertent disruption of one or more particular units in the course of manipulations of another which occurrences could variously result in contamination of personnel or the adjacent environment or have adverse effects on the materials which are being processed depending on the nature of such materials.

While the invention has been described with respect to a specific preferred example, many variations are possible and it is not intended to limit the invention except as defined in the following claims.

We claim:

1. In vacuum filtration apparatus having a stand for supporting a plurality of filtration units which include filtrate receiver flasks and having a source of low pressure and means for communicating said filtrate receiver flasks with said low pressure source, the improvement comprising:

means for enabling rotational movement of said stand including the filtration units carried thereon about a predetermined axis, and means for maintaining said filtrate receiver flasks in communication with said low pressure source during said rotational movement of said stand, wherein said stand includes a rotatable tubular shaft having an internal passage and at least one shelf mounted thereon, bearing means for supporting said shaft for rotation about said axis, rotating seal means for communicating said low pressure source with said internal passage of said shaft, and means for selectively and individually connecting said filtrate receiver flasks with said internal passage of said shaft.

2. The apparatus set forth in claim 1 wherein said stand includes at least one circular shelf supported on said shaft in coaxial relationship therewith and having means for receiving and supporting a plurality of said filtration units at angularly spaced apart positions around said shelf.

3. The apparatus of claim 1 wherein said means for selectively and individually connecting said filtrate receiver flasks with said internal passage of said shaft includes a plurality of fittings secured to said shaft and extending radially therefrom each being communicated with said internal passage, a plurality of vacuum conduits, and connector means for selectively communicating ones of said flasks with ones of said fittings through separate ones of said conduits, said fittings and said vacuum conduits and said connector means being revolvable about said axis with said stand as said stand undergoes said rotational movement.

4. The apparatus of claim 3 wherein said conduits are sufficiently rigid to support said flasks on said shaft.

5. The apparatus of claim 3 wherein a first group of said fittings extend radially from said shaft at a first vertical level thereon and a second group of said fittings extend radially from said shaft at a second lower vertical level thereon, said fittings of said second group being at angular positions around said shaft which are intermediate between the angular positions of said fittings of said first group thereof.

6. The apparatus of claim 3 wherein said connector means includes a first connector element attached to an associated one of said fittings of said shaft and a second connector element attached to one of said filtrate receiver flasks, and means for selectively engaging and disengaging said first and second connector elements.

7. The apparatus of claim 6 wherein said connector means provides for selectively communicating said flask with said internal passage of said shaft and for selectively blocking communication between said flask and said internal passage.

8. The apparatus set forth in claim 1 further including a plurality of vertically spaced apart circular shelves supported on said shaft in coaxial relationship therewith, said shelves having means for supporting said filtration units.

9. The apparatus set forth in claim 1 further including a housing with means for inhibiting uncontrolled escape of gases therefrom, said stand being disposed within said housing.

10. The apparatus set forth in claim 9 wherein said housing is a fume hood.

11. Vacuum filtration apparatus comprising:
a vertically extending rotatable shaft having a passage extending therealong,
means for supporting a plurality of vacuum filtration units on said shaft at angularly spaced apart positions therearound,
a suction pump having an intake conduit,
rotary seal means for communicating said intake conduit with said passage while enabling rotational movement of said shaft and said filtration units supported thereon, and
means for selectively and individually communicating said passage of said shaft with ones of said filtration units which are supported on said shaft.

12. Vacuum filtration apparatus as defined in claim 11 further including housing means for at least partially enclosing said shaft and said vacuum filtration units supported thereon, and means for inhibiting uncontrolled release of vapors from said housing means.

13. Vacuum filtration apparatus comprising:
a housing having access means for enabling manipulation of objects situated therein by an externally located operator,
a plurality of vertically extending, spaced apart, rotatable shafts disposed in said housing, each of said shafts having a passage extending therealong,
means for supporting a plurality of separate vacuum filtration units on each of said shafts for rotation therewith,
means for selectively connecting said passage of each of said shafts with said filtration units which are supported thereon,
a source of partial vacuum, and
rotating seal means for connecting said passage of each of said shafts with said source of partial vacuum.

* * * * *